United States Patent
Durbin et al.

(10) Patent No.: US 11,350,656 B2
(45) Date of Patent: Jun. 7, 2022

(54) WHIPPABLE FOOD PRODUCTS, WHIPPED FOOD PRODUCTS, AND METHODS OF MAKING THE SAME

(71) Applicant: Tate & Lyle Custom Ingredients LLC, Sycamore, IL (US)

(72) Inventors: Jacob Michael Durbin, Sycamore, IL (US); David Leonard Hoyda, Sycamore, IL (US)

(73) Assignee: TATE & LYLE CUSTOM INGREDIENTS LLC, Sycamore, IL (US)

( * ) Notice: Subject to any disclaimer, the term of this patent is extended or adjusted under 35 U.S.C. 154(b) by 0 days.

(21) Appl. No.: 15/514,357

(22) PCT Filed: Sep. 25, 2015

(86) PCT No.: PCT/US2015/052461
§ 371 (c)(1),
(2) Date: Mar. 24, 2017

(87) PCT Pub. No.: WO2016/049577
PCT Pub. Date: Mar. 31, 2016

(65) Prior Publication Data
US 2017/0295835 A1  Oct. 19, 2017

Related U.S. Application Data

(60) Provisional application No. 62/056,080, filed on Sep. 26, 2014.

(51) Int. Cl.
| | |
|---|---|
| *A23L 29/10* | (2016.01) |
| *A23P 30/40* | (2016.01) |
| *A23L 29/206* | (2016.01) |
| *A23L 9/10* | (2016.01) |
| *B65D 83/14* | (2006.01) |
| *A23G 3/00* | (2006.01) |

(52) U.S. Cl.
CPC ............ *A23L 29/10* (2016.08); *A23G 3/00* (2013.01); *A23L 9/10* (2016.08); *A23L 29/206* (2016.08); *A23P 30/40* (2016.08); *B65D 83/14* (2013.01); *A23C 2270/10* (2013.01); *A23V 2002/00* (2013.01)

(58) Field of Classification Search
CPC . A23P 30/40; A23G 3/00; A23L 29/10; A23L 29/206
USPC ......................................................... 426/564
See application file for complete search history.

(56) References Cited

U.S. PATENT DOCUMENTS

| | | | |
|---|---|---|---|
| 4,840,813 A * | 6/1989 | Greenberg ............... | A23G 9/40 426/565 |
| 5,789,004 A | 8/1998 | Hogan et al. | |
| 6,372,280 B1 | 4/2002 | Gonsalves et al. | |
| 7,700,144 B2 | 4/2010 | Pandey et al. | |
| 7,776,376 B2 | 8/2010 | Perks et al. | |
| 8,603,559 B2 | 12/2013 | Perks et al. | |
| 2003/0031758 A1* | 2/2003 | Koss ........................ | A23G 9/04 426/72 |
| 2003/0108591 A1* | 6/2003 | Meijer ................. | A23D 7/0056 424/439 |
| 2007/0003681 A1* | 1/2007 | Kim ..................... | A23C 9/1307 426/564 |
| 2009/0041919 A1 | 2/2009 | Perks | |
| 2010/0034753 A1* | 2/2010 | Cox ........................ | A23L 1/293 424/45 |
| 2010/0189867 A1* | 7/2010 | Blijdenstein ........... | A23C 13/12 426/589 |
| 2011/0281011 A1 | 11/2011 | Colavito | |

FOREIGN PATENT DOCUMENTS

| | | |
|---|---|---|
| DE | 2258071 | 6/1974 |
| DE | 3638662 | 6/1987 |
| EP | 1287749 | 3/2003 |
| EP | 1738650 | 3/2007 |
| EP | 1782699 | 5/2007 |
| FR | 2607676 | 6/1977 |
| FR | 2710501 | 4/1995 |
| FR | 2985885 | 7/2013 |
| JP | 2008173115 A | 7/2008 |
| WO | 2008046729 | 4/2008 |

(Continued)

OTHER PUBLICATIONS

Igoe Dictionary of Food Ingredients 3rd Edition Chapman and Hall 1996 pp. 69, 70 and 83 (Year: 1996).*

(Continued)

*Primary Examiner* — Jyoti Chawla
(74) *Attorney, Agent, or Firm* — McDonnell Boehnen Hulbert & Berghoff LLP

(57) ABSTRACT

A whippable food product has less than 5% by weight fat and includes about 0.5% to about 30% by weight of a dietary fiber; about 50% to about 95% by weight of water; up to about 5% by weight of a protein; up to about 5% by weight of a food starch; up to about 5% by weight of an emulsifier; and up to about 5% by weight of a hydrocolloid. The total amount of the protein, food starch, emulsifier, and hydrocolloid is within the range of about 0.25% to about 20% by weight. In certain embodiments, the whippable food product is substantially free of emulsifier. Such a whippable food product can be capable of being aerated, for example, to a stable foam having an overrun in the range of 100%-700%.

24 Claims, No Drawings

(56) References Cited

FOREIGN PATENT DOCUMENTS

WO    WO 2011/047787    4/2011

OTHER PUBLICATIONS

USDA pp. 1-4, https://ndb.nal.usda.gov/ndb/search/list printed Mar. 19, 2019 (Year: 2019).*
Belitz-Grosch, "Food Chemistry," 1997, Springer, Berlin, XP002752324, pp. 634-634.
International Search Report and Written Opinion dated Dec. 22, 2015 of International Application No. PCT/US2015/052461 filed Sep. 25, 2015, 15 pages.

* cited by examiner

WHIPPABLE FOOD PRODUCTS, WHIPPED FOOD PRODUCTS, AND METHODS OF MAKING THE SAME

CROSS-REFERENCE TO RELATED APPLICATIONS

This application is a U.S. National Stage Application under 35 U.S.C. 371 of International Patent Application no. PCT/US2015/052461, which claims the benefit of priority of U.S. Provisional Patent Application No. 62/056,080, filed Sep. 26, 2014, and U.K. Patent Application no. GB1421495.1, filed Dec. 3, 2014, each of which is hereby incorporated herein by reference in its entirety.

BACKGROUND OF THE INVENTION

Field of the Invention

This disclosure relates generally to whippable food products and methods for making the whippable food products. More specifically, this disclosure relates to whippable food products that contain dietary fiber and less than 5% by weight of fat, in addition to methods for making whippable food products and for making whipped food products therefrom.

Description of Related Art

Whipped food products are commonly used as toppings, icings, fillings, and the like for appetizers, entrees, and desserts. There are a number of factors that customers consider when evaluating the desirability of whippable food products. Some of those factors include, but are not limited to, taste, texture, stability, visual appeal, nutritional value, and price, among others. As such, whippable food products are produced with a wide variety of textures and tastes and are prepared with varying ingredients and cooking techniques in order to appeal to a wide array of customers.

Whipped food products are typically processed through a technique known as aeration. Aeration may occur by physically whipping a whippable food product with a mixer, whisk, or fork or by releasing a whippable food product through an orifice from a pressurized canister. A wide variety of whipped food products, such as whipped cream, are currently available to customers for food consumption. In their basic form, these whipped food products are typically made from ingredients such as cream and sugar. Imitation whipped creams are commercially available as well and are made for various reasons, including to exclude dairy ingredients, to provide extended shelf life, and to reduce prices. Imitation creams typically contain a mixture of partially hydrogenated oil, sweeteners, water, hydrocolloids, and emulsifiers.

In particular, the basic composition of most whipped products contains large amounts of fat (between 10% and 40% by weight of the mixture), which helps to stabilize the air cell structure which results in a stable whipped product. Typically, the higher the fat content, the easier the whippable solution may be whipped. Lower fat, non-dairy, or imitation whipped creams utilize emulsifiers and hydrocolloids to help aid the development and stabilization of the air cells in combination with the fat that is present.

Production of a whippable food product that has a fat content of less than 3% and uses fruit or vegetable juice as a main ingredient still presents a challenge. Accordingly, there remains a need for improved low-fat whippable food products.

SUMMARY OF THE INVENTION

In one broad aspect, the disclosure provides a whippable food product comprising:
  about 0.5% to about 30% by weight of dietary fiber;
  about 50% to about 95% by weight of water;
  up to about 5% by weight of protein;
  up to about 5% by weight of food starch;
  up to about 5% by weight of emulsifier; and
  up to about 5% by weight of hydrocolloid;
wherein the total amount of the protein, food starch, emulsifier, and hydrocolloid is within the range of about 0.25% to about 20% by weight of the whippable food product, and
wherein the whippable food product has less than 5% by weight fat.

In another aspect, the disclosure provides a whippable food product comprising:
  about 0.5% to about 10% by weight of dietary fiber;
  about 50% to about 95% by weight of water;
  about 0.13% to about 5% by weight of protein;
  about 0.10% to about 5% by weight of food starch; and
  about 0.05% to about 5% by weight of hydrocolloid,
wherein the total amount of the protein, food starch and hydrocolloid is within the range of about 0.25% to about 10% by weight of the whippable food product, and
wherein the whippable food product has less than 5% by weight fat.

Such whippable food products can be capable of being aerated, for example, to a stable foam having an overrun of at least about 100%, of at least about 200%, of at least about 250%, of at least about 300% or at least about 400% (e.g., in the range of 100%-700%, or in the range of 200%-500%).

In another aspect, the disclosure provides methods of making the whippable food product described herein.

In another aspect, the disclosure provides a whipped food product made by aerating the whippable food product as described herein. The aeration can be performed at a variety of temperatures, e.g., at a temperature of at least about 70° F. or even at least about 75° F.

In another aspect, the disclosure provides a whipped food product comprising
  about 0.5% to about 30% by weight of dietary fiber;
  about 50% to about 95% by weight of water;
  up to about 5% by weight of protein;
  up to about 5% by weight of food starch;
  up to about 5% by weight of emulsifier; and
  up to about 5% by weight of hydrocolloid;
wherein the total amount of the protein, food starch, emulsifier, and hydrocolloid is within the range of about 0.25% to about 20% by weight of the whippable food product, and
wherein the whipped food product has less than 5% by weight fat.

In another aspect, the disclosure provides a whipped food product comprising
  about 0.5% to about 10% by weight of dietary fiber;
  about 50% to about 95% by weight of water;
  about 0.13% to about 5% by weight of protein;
  about 0.1% to about 5% by weight of food starch;
  about 0.05% to about 5% by weight of hydrocolloid;

wherein the total amount of the protein, food starch and hydrocolloid is within the range of about 0.25% to about 10% by weight of the whippable food product, and wherein the whippable food product has less than 5% by weight fat.

The whipped food products can be, for example, in the form of a stable foam having an overrun of at least about 100%, or even at least about 200%, or at least about 250%, e.g., in the range of 100-700%, in the range of 200%-500% or in the range of 250%-500% or in the range of 250% to 600% or in the range of 250% to 500%, or in the range of 300% to 700%, or in the range of 300% to 700%.

In certain embodiments of the whippable food products and the whipped food products described herein, substantially no emulsifier is present.

The methods and food products described herein can enjoy a number of advantages. For example, most whippable food products contain large amounts of fat (e.g., between 10% and 40%). In certain embodiments of the methods and food products described herein, the whippable food product contains less than 5% fat by weight and uses dietary fibers along with one or more other components such as protein, starch, emulsifiers and hydrocolloids, that can, when the food product is aerated to provide a whipped food product, stabilize air cells to provide stability to the whipped food product. Decreasing the total fat content may provide a product with approximately one-quarter of the amount of calories compared to conventional whipped toppings. In certain aspects, the products disclosed herein may also have a longer shelf life, as they are capable of being frozen and thawed. Accordingly, the compositions and methods described herein can advantageously create a whippable product with reduced caloric intake and increased shelf life, while also providing desirable texture and taste.

DETAILED DESCRIPTION OF THE INVENTION

Before the disclosed compositions, methods and products are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The person of ordinary skill in the art will appreciate that combinations of various embodiments described herein are specifically contemplated (to the extent such combinations are not incompatible). For example, if in one section the specification describes a particular protein for use in the described compositions, and in another section the specification describes particular hydrocolloid for use in the described compositions, the specification also specifically contemplates compositions that include the particular protein in combination with the particular hydrocolloid. The same holds true for described ranges and any described features of the compositions and methods described herein.

In view of the present disclosure, the whippable food product and processes described herein can be configured by the person of ordinary skill in the art to meet the desired need. In general, the disclosed materials and processes provide improvements of a whippable food product that includes at least fiber, water, and one or more other additives such as proteins, starches, emulsifiers and hydrocolloids. Notably, the food products described herein have less than 5% by weight of fat. In certain embodiments of the invention described herein, the whippable food product may be substantially free of fat.

One embodiment of the disclosure is a whippable food product comprising
  about 0.5% to about 30% by weight of dietary fiber;
  about 50% to about 95% by weight of water;
  up to about 5% by weight of protein;
  up to about 5% by weight of food starch;
  up to about 5% by weight of emulsifier; and
  up to about 5% by weight of hydrocolloid;
wherein the total amount of the protein, food starch, emulsifier, and hydrocolloid is within the range of about 0.25% to about 20% by weight of the whippable food product, and
wherein the whipped food product has less than 5% by weight fat.

As described above, one component of the whippable food product described herein is dietary fiber, in an amount within the range of about 0.5% to about 30%. Dietary fiber can be help to improve water binding and provide structure in the whipped food product. As used herein, "dietary fiber" refers to the fiber from all ingredients, i.e., both fiber that is part of fruit or vegetable matter and fiber that is added in isolated, purified or processed form. As the person of ordinary skill in the art will appreciate, the dietary fiber can be provided in a variety of forms. For example, the dietary fiber can be provided in a substantially natural form, for example, in the form of a fruit or vegetable juice, puree or solids. Dietary fiber may also be provided in the form of a processed fiber, for example, isolated, purified, and/or modified fiber. The fiber may include, for example, a corn fiber, for example a processed corn fiber. In yet further embodiments, the dietary fiber includes a oat fiber, such as oat beta-glucan (e.g., processed oat beta-glucan). In other embodiments, the dietary fiber includes a citrus fiber (e.g., a processed citrus fiber). In other embodiments, the dietary fiber includes a bamboo fiber (e.g., a processed bamboo fiber). In other embodiments, the dietary fiber includes polydextrose or soluble corn fiber (e.g., as sold under the trade name PROMITOR™). In various embodiments, the dietary fiber is insoluble fiber, soluble fiber, or a combination of the two.

The dietary fiber may be fiber derived from plants, including fruits, vegetables, legumes, grains, and nuts, among others. In certain embodiments, the fiber may be derived from one or more of the following plants: acai, aloe, apple, apricot, banana, blackberry, blueberry, boysenberry, cantaloupe, cherry, coffee, tea, coconut, corn, cranberry, date, elderberry, fig, gooseberry, grape, grapefruit, citrus, guava, honeydew, kiwi, konjac, kumquat, lemon, lime, mango, nectarine, orange, papaya, passion fruit, peach, pear, persimmon, pineapple, plantain, plum, pomegranate, prune, pumpkin, raspberry, star fruit, strawberry, tangerine, tomato, watermelon, avocado, cabbage, carrot, celery, cucumber, elderflower, kale, leek, potato, spinach, zucchini, oats, barley, rye, chia, soy, psyllium seed husks, almonds, pistachios, peanuts, macadamia nuts, walnuts, pecans, and sunflower seeds. The person of ordinary skill in the art will appreciate that other types of fruit, vegetables, plants, legumes, grains, and nuts may be alternatively or additionally used. The fiber may be from a combination of various fruits, vegetables, plants, legumes, grains, and nuts; the person ordinary skill will appreciate that different blends of fruit and vegetables can provide different flavors and consistencies to the whippable food product. In one embodiment, the dietary fiber includes coconut fiber, citrus fiber, pineapple fiber, or a combination thereof, e.g., in an amount of at least about 20%, at least about 50%, at least about 70% or at least about 90% of the fiber component of the whippable food product.

In certain embodiments, the dietary fiber (in whole or in part) may be provided to the whippable food product in the form of fruit or vegetable matter. For example, the fiber can be provided as part of a fruit or vegetable juice. The concentration of the fruit or vegetable juice may vary. For example, the fruit or vegetable juice may be provided in the form of a concentrate or may be diluted, for example, using water or some other aqueous media. The dietary fiber may alternatively, or additionally, be provided to the whippable food product in the form of fruit or vegetable solids. Moreover, the dietary fiber may alternatively or additionally be provided to the whippable food product in the form of a fruit or vegetable puree. Combinations of the above may be used; for example, the dietary fiber can be provided in the form of juice and solids, juice and puree, puree and solids, or as a combination of all three. As the person of ordinary skill in the art will appreciate, the form in which the dietary fiber is provided will impact the amount of water or other aqueous media to be added during formulation to arrive at the desired amount of water in the whippable food product. In yet further embodiments, the dietary fiber may be provided to the whippable food product as part of a nut paste or butter.

As the person of ordinary skill in the art will appreciate, the dietary fiber in the whippable food product can be provided solely from fruit or vegetable matter, solely from processed fiber, or as a combination of the two. In certain embodiments, more than 20%, more than 50%, or more than 80% by weight of the dietary fiber is provided to the whippable food product in the form of fruit or vegetable matter (e.g., juice, puree or concentrate). The person of ordinary skill in the art will appreciate that when using fruit or vegetable sources with relatively low amounts of indigenous fiber, processed fiber can be added to the composition to provide the desired amount of fiber to the whippable food product. Accordingly, in certain embodiments, more than 20%, more than 50%, or even more than 80% by weight of the dietary fiber is provided to the whippable food product in the form of an isolated, purified, and/or modified fiber.

The person of ordinary skill in the art will appreciate that any combination of the above-described fibers may be used as the dietary fiber component of the compositions described herein.

The amount of dietary fiber in the whippable food products described herein may vary based on the desired type of whippable food product. In certain embodiments, increasing the amount of fiber in the whippable food product will create a stiffer, more stable product when whipped, while decreasing the amount of fiber in the whippable food product will create a softer, less stable product. Further, the type of dietary fiber chosen may contribute to the overall flavor of the whippable food product and be used as a flavoring agent. Many varieties of dietary fibers may be combined to reach the desired structure, stability, and flavor. In certain embodiments of the invention as described herein, the amount of dietary fiber in the whippable food product may range from about 0.5% to about 30% of the weight of the whippable food product. For example, in one embodiment of the invention as described herein, the amount of dietary fiber ranges from about 1% to about 25% of the weight of the whippable food product. In other embodiments, the amount of dietary fiber in the whippable food product ranges from about 1% to about 15%, from about 5% to about 15% or from about 1% to about 10% of the weight of the whippable food product. In still other embodiments, the amount of dietary fiber in the whippable food products as described herein is in the range of about 0.5% to about 10%, or about 0.5% to about 8%, or about 0.5% to about 6%, or about 0.5% to about 5%, or about 0.5% to about 3%, or about 0.5% to about 2%, or about 0.75% to about 10%, or about 0.75% to about 8%, or about 0.75% to about 6%, or about 0.75% to about 5%, or about 0.75% to about 3%, or about 0.75% to about 2%, or about 1% to about 10%, or about 1% to about 8%, or about 1% to about 6%, or about 1% to about 5%, or about 2% to about 10%, or about 2% to about 8%, or about 2% to about 6%, or about 2% to about 5%, The whippable food product as described herein includes water in the amount of about 50% to about 95% of the weight of the whippable food product. Water can be used to dilute the composition in order to provide the desired consistency or viscosity to the product for aeration, and will affect the structure of the food product once aerated to make a whipped food product. For example, decreasing the amount of water in the whippable food product may improve the stability of the product. The addition of water may also alter the flavor of the composition and aid in homogenization. It may be desirable to maximize the amount of water, for example, to reduce the overall caloric content of the whippable food product. The person or ordinary skill in the art will use an amount of water that provides the desired characteristics to the whipped food product.

In certain embodiments of the invention as described herein, the amount of water may range from about 50% to about 80% of the weight of the whippable food product. In other embodiments, the amount of water in the whippable food product may range from about 60% to about 80%, from about 65% to about 85%, or from about 70% to about 95%, or from about 75% to about 85%, or from about 80% to about 85%, or from about 75% to about 95%, from about 80% to about 90%, or from about 85% to about 95%, or from about 90% to about 95%, or from about 70% to about 90%, or from about 75% to about 90%, or from about 80% to about 90%, or from about 85% to about 90% of the weight of the whippable food product.

As used herein, the water component of the whippable food product is the total amount of water in the whippable food product, regardless of source. As the person of ordinary skill in the art will appreciate, the water may be provided to the whippable food product in a variety of forms. Water can be provided as water per se (e.g., used to dilute or reconstitute the dietary fiber or the fruit or vegetable solids) or in the form of a fruit or vegetable juice, coffee or tea. Water can also be provided by other ingredients of the composition, such as acidic solutions, flavoring agents, coloring agents, fruit or vegetable purees, fruit or vegetable solids and hydrocolloids, among others.

As described above, the whippable food products can include one or more of proteins, starches, emulsifiers and hydrocolloids. For example, in various embodiments, the whippable food products described herein comprise (at least) protein, starch, emulsifier and hydrocolloid; protein, starch and emulsifier; protein, starch and hydrocolloid; protein, emulsifier and hydrocolloid; starch, emulsifier and hydrocolloid; protein and starch; protein and emulsifier; protein and hydrocolloid; starch and emulsifier; starch and hydrocolloid; emulsifier and hydrocolloid; protein; starch; emulsifier; or hydrocolloid. In the whippable food products described herein, the total amount of protein, starch, emulsifier, and hydrocolloid is within the range of about 0.25% to about 20% by weight of the whippable food product. For example, in one embodiment of the whippable food products as described herein, the total amount of protein, starch, emulsifier, and hydrocolloid is within the range of about 1% to about 15% of the weight of the whippable food product. In other embodiments, the total amount of protein, starch, emulsifier, and hydrocolloid is within the range of from about 0.25% to about 10%, or from about 0.25% to about 7%, or from about 0.25% to about 5%, or from about 0.25% to about 2%, or from about 0.5% to about 10%, or from about 0.5% to about 5%, or from about 0.5% to about 2%, or from about 1% to about 10%, or from about 1% to about 7%, or from about 1% to about 5%, or from about 2% to about 10%, or from about 2% to about 7%, or from about 5% to about 20%, or from about 5% to about 15%, or from about 5% to about 10% of the weight of the whippable food product. Notably, these materials can be provided as part of fruit or vegetable matter (e.g., in the same component as fruit or vegetable matter that provides dietary fiber to the composition), or as part of a separate component (e.g., in processed form, for example, as isolated or purified materials). In certain embodiments of the whippable food compositions as described herein, at least about 20%, at least about 50%, at least about 70%, at least about 80%, at least about 90%, or even at least about 95% of the total protein, starch, emulsifier and hydrocolloid is provided by sources other than fruit or vegetable matter (e.g., juices, solids, purees, coffee, tea) present in the whippable food product.

The person of ordinary skill in the art will appreciate that proteins, starches, emulsifiers and/or hydrocolloids can be provided to the whippable food product in any convenient manner. For example, such components (or fractions of such components) can be combined as a pre-blend, which is used to formulate the whippable food product (e.g., by addition to fruit or vegetable matter and/or water or other aqueous components). The particular composition of the pre-blend may vary based on the other ingredients of the composition, e.g., the identities and amounts of fruit- or vegetable-based components. For example, depending on the particular desired whippable composition (e.g., when a particularly starchy vegetable component is used) it may not be necessary to include starch in the pre-blend. Of course, such components can be added separately, or in other combinations. Other ingredients, such as bulking agents, sweeteners, flavoring agents, and coloring agents, among others, may be included in the pre-blend composition. The pre-blend composition may be used in a variety of forms, for example, liquid, gel, or powder.

As described above, protein may be present in the whippable food product. When present, the protein may be present, for example, in an amount within the range of about 0.0001% to about 5% by weight of the whippable food product. The protein component includes both any protein provided by any fruit or vegetable matter present in the formulation, as well as any separately-added protein. Certain particular embodiments of the composition of the whippable food product are described herein with respect to the type of protein present in the whippable food product. In particular, the type of protein present in the whippable food product may vary based on the type of whippable food product desired. Types of protein may include, but are not limited to, rice protein, egg protein (e.g., egg whites, for example, angel-type egg), milk protein, wheat protein (e.g., hydrolyzed wheat protein), hemp protein, cranberry protein, artichoke protein, casein protein (e.g., hydrolyzed casein), whey protein, soy protein, rice protein, pea protein, potato protein, oat protein, gluten protein, or mixtures thereof. For example, in certain embodiments, the protein component includes one or more of hydrolyzed casein, hydrolyzed wheat protein, egg whites or whey protein. For example, at least about 20%, at least about 50%, at least about 80%, or at least about 90% of the protein can be hydrolyzed casein, hydrolyzed wheat protein, egg whites or whey protein, or a combination thereof. The person of ordinary skill in the art will understand that protein from other sources may be acceptable as well.

Also, a chemically or physically altered protein may be used, including, for example, a hydrolyzed protein, a micronized protein, or a microparticularized protein. In one embodiment, the protein may comprise a hydrolyzed protein. Hydrolyzed proteins may be made by treatment with aqueous acid or aqueous base, or by treatment with one or more enzymes. Other processes for producing hydrolyzed protein may alternatively be used. The hydrolyzed protein may be, for example, hydrolyzed milk protein (e.g., hydrolyzed casein, available under the trade name HYFOAMA DSN), hydrolyzed wheat protein (available under the trade name HYFOAMA 77), hydrolyzed soy protein, hydrolyzed vegetable protein, or hydrolyzed wheat protein. As would be recognized by the person of ordinary skill in the art, the use of hydrolyzed proteins aids in the modification of allergenic properties of the protein, thus allowing more suitable consumption by individuals suffering from food allergies. As the person of ordinary skill in the art will appreciate, the hydrolyzed protein may be provided as a dry material, or may be provided together with some of the water of the composition of the whippable food product.

In certain embodiments, the type of protein selected to produce the whippable food product may consist of a combination of different types of protein (any or all of which may be hydrolyzed). For example, in certain embodiments, the protein is a combination of a milk protein and an egg protein. In certain embodiments, at least some of the protein (e.g., at least about 50%, at least about 90%, at least about 95%, or even at least about 99%) is not a fruit protein. In certain embodiments, at least some of the protein (e.g., at least about 50%, at least about 90%, at least about 95%, or even at least about 99%) is not a protein from a fruit or vegetable that is a substantial source of dietary fiber in the whippable food product. In certain embodiments, at least about 20%, at least about 50%, at least about 70%, at least about 80%, at least about 90%, at least about 95%, at least about 98%, or even at least about 99% of the total protein is provided by sources other than fruit or vegetable matter (e.g., juices, solids, purees, coffee, tea) present in the whippable food product.

The person of ordinary skill in the art will appreciate that any combination of the above-described proteins may be used as the dietary fiber component of the compositions described herein.

For example, in one embodiment of the invention as described herein, the amount of protein ranges from about 0.001% to about 5% of the weight of the whippable food product. In other embodiments, the amount of protein in the whippable food product ranges from about 0.01% to about 5%, or from about 0.01% to about 2%, or from about 0.1% to about 5%, or from about 0.1% to about 4%, or from about 0.1 to about 3%, or from about 0.1% to about 2%, or from about 0.5% to about 5%, or from about 0.5% to about 3%, or from about 0.5% to about 2%, or from about 1% to about 5%, or from about 1% to about 4%, or from about 1% to about 3%, or from about 2% to about 5%, or from about 5% to about 4% of the weight of the whippable food product. In other examples, the protein can be present in the whippable compositions described herein in an amount in the range of about 0.13% to about 5%, or about 0.13% to about 3.5%, or about 0.13% to about 2%, or about 0.13% to about 1%, or about 0.25% to about 5%, or about 0.25% to about 3.5%, or about 0.25% to about 2%, or about 0.25% to about 1%, or about 0.5% to about 5%, or about 0.5% to about 3.5%, or about 0.5% to about 2%, or about 0.5% to about 1%, or about 1% to about 5%, or about 1% to about 3.5%, or about 0.5% to about 2% by weight of the whippable food product.

In certain embodiments of the whippable food compositions described herein, the protein component includes one or more of hydrolyzed casein, hydrolyzed wheat protein, egg white and whey protein, for example in an amount in the range of about 0.13% to about 5%, or about 0.13% to about 3.5%, or about 0.13% to about 2%, or about 0.13% to about 1%, or about 0.25% to about 5%, or about 0.25% to about 3.5%, or about 0.25% to about 2%, or about 0.25% to about 1%, or about 0.5% to about 5%, or about 0.5% to about 3.5%, or about 0.5% to about 2%, or about 0.5% to about 1%, or about 1% to about 5%, or about 1% to about 3.5%, or about 1% to about 2% by weight of the whippable food product.

As described above, food starch may be present in the whippable food product. When present, the starch may be present, for example, in an amount within the range of about 0.0001% to about 5%. The food starch component includes both starch provided by any fruit or vegetable matter present in the formulation, as well as any separately-added starch. Certain particular embodiments of the composition of the whippable food product are described herein with respect to the type of food starch present the whippable food product. In particular, the type of food starch present in the whippable food product may vary based on the type of whippable food product desired. Types of food starch may include, but are not limited to native (or unmodified) starch, modified starch, pre-gelatinized starch, pre-gelatinized-waxy starch, a cold-water swelling starch, an instant starch, a lipophilic starch, an unsubstituted starch, and a cook-up starch, among others. Further, starch may be produced from corn, waxy corn, potato, rice, wheat, or tapioca, among others. The starch may be pregelatinized, granular or a combination of both; the person of ordinary skill in the art will appreciate that the texture and mouthfeel of the whippable food product can be adjusted by the choice of such starches. In certain embodiments, the starch may be a native starch. In other embodiments, the starch may be modified starch, which may be prepared by physically, enzymatically, or chemically treating native starch, resulting in a modified version of the starch. Modified starches are modified in a variety of fashions to improve food quality and performance. For example, modified starches may allow for less gelling, more stability, and greater water retention as compared to unmodified starches. Examples of modified starches include, but are not limited to: acid-treated starch, roasted starch with hydrochloric acid (dextrin), alkaline-modified starch, bleached starch, oxidized starch, enzyme-treated starch, monostarch phosphate, distarch phosphate, acetylated starch, hydroxypropylated starch, hydroxyethyl starch, starch sodium octenyl succinate, starch aluminum ocetenyl succinate, cationic starch, carboxymethylated starch, among others. Particular examples of types starches that may be present in the whippable food product include dent (i.e., corn) pregelatinized starches, dent granular starches, waxy (i.e., corn) pregelatinized starches, potato pregelatinized starches, waxy spray cook starches, tapioca pregelatinized starches, instant starches, lipophilic starches, fat mimetic starches, dent cookup starches, waxy cookup starches, tapioca cookup starches, potato cookup starches, and native (unmodified starches). One particular type of starch suitable for use is a cook-up modified starch from waxy maize (e.g., available from Tate & Lyle Ingredients Americas LLC under the trade name THIN-N-THIK®).

In certain embodiments, at least some of the starch (e.g., at least about 50%, at least about 90%, at least about 95%, or even at least about 99%) is not a fruit starch. In certain embodiments, at least some of the starch (e.g., at least about 50%, at least about 90%, at least about 95%, or even at least about 99%) is not a starch from a fruit or vegetable that is a substantial source of dietary fiber in the composition. In certain embodiments, at least about 20%, at least about 50%, at least about 70%, at least about 80%, at least about 90%, at least about 95%, at least about 98%, or even at least about 99% of the total starch is provided by sources other than fruit or vegetable matter (e.g., juices, solids, purees, tea, coffee) present in the whippable food product. But in other embodiments, a significant fraction (e.g., at least about 20%, at least about 50%, at least about 70%, at least about 80%, at least about 90%, at least about 95%, at least about 98%, or even at least about 99%) of the starch is provided by the fruit or vegetable matter present in the whippable food product.

In certain embodiments of the whippable food compositions as described herein, the amount of starch in the whippable food product may range from about 0.001% to about 5% of the weight of the whippable food product. In other embodiments, the amount of starch in the whippable food product ranges from about 0.01% to about 5%, or from about 0.01% to about 2%, or from about 0.1% to about 5%, or from about 0.1% to about 4%, or from about 0.1 to about 3%, or from about 0.1% to about 2%, or from about 0.1% to about 1%, or from about 0.25% to about 5%, or from about 0.25% to about 4%, or from about 0.25 to about 3%, or from about 0.25% to about 2%, or from about 0.25% to about 1%, or from about 0.5% to about 5%, or from about 0.5% to about 3%, or from about 0.5% to about 2%, or from about 0.5% to about 1%, or from about 1% to about 5%, or from about 1% to about 4%, or from about 1% to about 3%, or from about 1% to about 5% of the weight of the whippable food product.

In certain embodiments of the whippable food compositions described herein, the starch component includes a modified food starch, for example in an amount in the range of about 0.13% to about 5%, or from about 0.13% to about 4%, or from about 0.13 to about 3%, or from about 0.13% to about 2%, or from about 0.13% to about 2%, or from about 0.25% to about 5%, or from about 0.25% to about 4%, or from about 0.25 to about 3%, or from about 0.25% to about 2% by weight of the whippable food product.

As described above, while in many embodiments substantially no emulsifier is present, in other embodiments an emulsifier may be present in the whippable food product. When present, the emulsifier may be present, for example, in an amount within the range of about 0.0001% to about 5%. As the person of ordinary skill in the art will appreciate, an emulsifier is a substance that stabilizes an emulsion. An emulsifier can be used to help provide stability and homogeneity to the whippable food product such that it is easier to combine the desired ingredients and obtain a desired structure. A variety, and combination, of emulsifiers may be used, including, but not limited to, lecithin (e.g., from eggs or soy), lactic acid esters of mono and diglycerides, acetic acid esters of mono and diglycerides, polyglycerol esters, propylene glycol esters, polypropylene glycol esters, sucrose esters, lecithin, cellulose gum, microcrystalline cellulose, hydroxypropyl methylcellulose (hypromellose or HPMC), modified cellulose, propylene glycol alginatelecithin, monoglycerides (e.g., of fatty acids), diglycerides (e.g., of fatty acids), lactic acid esters of mono- and diglycerides (e.g., of fatty acids), a polysorbate, calcium stearoyl-2-lactylate, lactylic stearate, sodium stearoyl fumarate, succinylated monoglyceride, and sodium stearoyl-2-lactylate, among others. In certain embodiments, at least some of the emulsifier (e.g., at least about 50%, at least about 90%, at least about 95%, or even at least about 99%) is not an emulsifier from a fruit or vegetable that is a substantial source of dietary fiber in the composition. In certain embodiments, at least about 20%, at least about 50%, at least about 70%, at least about 80%, at least about 90%, at least about 95%, at least about 98%, or even at least about 99% of the total emulsifier is provided by sources other than fruit or vegetable matter (e.g., juices, solids, purees) present in the whippable food product.

In certain embodiments of the invention as described herein, the whippable food product may contain an emulsifier in the amount of, but not limited to, about 0.001% to about 5% of the weight of the whippable food product. In other embodiments, the amount of emulsifier in the whippable food product ranges from about 0.001% to about 4%, from about 0.001% to about 3%, from about 0.001% to about 2%, from about 0.001% to about 1%, from about 0.001% to about 0.5%, from about 0.001% to about 0.1%, from about 0.01% to about 3%, from about 0.1% to about 2%, from about 0.1% to about 1%, from about 1% to about 5%, or from about 1% to about 4%, from about 1% to about 3% of the weight of the whippable food product.

However, in certain advantageous embodiments of the whippable food compositions described herein, very little, or even substantially none of the above-listed emulsifiers is present. For example, in certain embodiments, less than about 0.25%, less than about 0.1%, or even less than about 0.05% of the above-listed emulsifiers is present.

In certain additional advantageous embodiments of the whippable food compositions described herein, very little, or even substantially none of any emulsifier is present. For example, in certain embodiments, less than about 0.25%, less than about 0.1%, or even less than about 0.05% of any emulsifier is present.

In certain additional advantageous embodiments of the whippable food compositions described herein, very little, or even substantially none of any fatty acyl-containing emulsifier is present. As used herein, a fatty acyl group has the structure R—C(O)— in which the R group is an alkyl or alkenyl group having 10 or more carbons. For example, in certain embodiments, less than about 0.25%, less than about 0.1%, or even less than about 0.05% of any fatty acyl-containing emulsifier is present.

As described above, a hydrocolloid may be present in the whippable food product. When present, the hydrocolloid may be present in an amount within the range of about 0.0001% to about 5%. As the person of ordinary skill in the art will appreciate, a hydrocolloid is a colloid system in which the colloid particles are hydrophilic polymers. Hydrocolloids are useful for improving stability of foam products in their aerated form (such as a whipped food product made from the whippable food product). A variety, and combination, of hydrocolloids may be used, including, but not limited to, pectin, alginic acid, agar, carrageenan, gelatin, cellulose gum, cellulose (e.g., microcrystalline cellulose), modified cellulose (e.g., hydroxypropyl methylcellulose, carboxymethyl cellulose), guar gum, locust bean gum, xanthan gum, gellan gum, gum acacia, karaya gum, tara gum, konjac flour, pectin, gelatin, and alginates (e.g., alginic acid and salts thereof such as sodium alginate and propylene glycol alginate). For example, in certain embodiments, the hydrocolloid is pectin, guar gum, xanthan gum, or locust bean gum, or a combination thereof (e.g., in an amount of at least about 20%, at least about 50%, at least about 70% or at least about 90% of the total hydrocolloid of the whippable food product). Other ingredients having the capability to bind water may also be provided in the form of a hydrocolloid. In certain embodiments, at least some of the hydrocolloid (e.g., at least about 50%, at least about 90%, at least about 95%, or even at least about 99%) is not a hydrocolloid from a fruit or vegetable that is a substantial source of dietary fiber in the composition. In certain embodiments, at least about 20%, at least about 50%, at least about 70%, at least about 80%, at least about 90%, at least about 95%, at least about 98%, or even at least about 99% of the total hydrocolloid is provided by sources other than fruit or vegetable matter (e.g., juices, solids, purees, coffee, tea) present in the whippable food product.

In certain embodiments of the invention as described herein, the whippable food product may contain a hydrocolloid in the amount of, but not limited to, about 0.001% to about 4% of the weight of the whippable food product. For example, in one embodiment of the invention as described herein, the amount of hydrocolloid ranges from about 0.001% to about 5% of the weight of the whippable food product. In other embodiments, the amount of hydrocolloid in the whippable food product ranges from about 0.01% to about 4%, from about 0.01% to about 3%, from about 0.01% to about 2%, or from about 0.01% to about 1%, or from about 0.01% to about 0.5%, or from about 0.01% to about 1%, or from about 0.05% to about 5%, or from about 0.05% to about 4%, from about 0.05% to about 3%, from about 0.05% to about 2%, or from about 0.05% to about 1%, or from about 0.05% to about 0.5%, or from about 0.1% to about 5%, or from about 0.1% to about 4%, or from about 0.1% to about 3%, or from about 0.1% to about 2%, or from about 0.1% to about 1%, or from about 0.2% to about 5%, or from about 0.2% to about 4%, from about 0.2% to about 3%, from about 0.2% to about 2%, or from about 0.2% to about 1%, or from about 0.2% to about 0.5%, or from about 0.5% to about 5%, or from about 0.5% to about 3%, or from about 0.5% to about 2% of the weight of the whippable food product.

In certain embodiments of the whippable food compositions described herein, the hydrocolloid component includes one or more of xanthan gum, pectin, locust bean gum, carrageenan, guar gum, and cellulose gum and modified cellulose, for example in an amount in the range of from about 0.05% to about 5%, or from about 0.05% to about 4%, from about 0.05% to about 3%, from about 0.05% to about 2%, or from about 0.05% to about 1%, or from about 0.05% to about 0.5%, or from about 0.1% to about 5%, or from about 0.1% to about 4%, or from about 0.1% to about 3%, or from about 0.1% to about 2%, or from about 0.1% to about 1%, or from about 0.1% to about 0.5%, or from about 0.2% to about 5%, or from about 0.2% to about 4%, from about 0.2% to about 3%, from about 0.2% to about 2%, or from about 0.2% to about 1%, or from about 0.2% to about 0.5% by weight of the whippable food product.

For example, in certain embodiments, a whippable food product as otherwise described above includes:

about 0.5% to about 10% by weight of dietary fiber (e.g., in an amount as described by any narrower range described above);

about 50% to about 95% by weight of water (e.g., in an amount as described by any narrower range described above);

about 0.13% to about 5% by weight of protein (e.g., in an amount as described by any narrower range described above);

about 0.10% to about 5% by weight of food starch (e.g., in an amount as described by any narrower range described above);

about 0.02% to about 5% by weight of hydrocolloid (e.g., in an amount as described by any narrower range described above);

wherein the total amount of the protein, food starch and hydrocolloid is within the range of about 0.25% to about 10% by weight of the whippable food product (e.g., in an amount as described by any narrower range described above); and wherein the whippable food product has less than 5% by weight fat (e.g., in an amount as described by any narrower range described above).

In other embodiments, a whippable food product as otherwise described above includes:

about 0.5% to about 5% by weight of dietary fiber (e.g., in an amount as described by any narrower range described above);

about 50% to about 95% by weight of water (e.g., in an amount as described by any narrower range described above);

about 0.25% to about 3.5% by weight of protein (e.g., in an amount as described by any narrower range described above);

about 0.25% to about 4% by weight of food starch (e.g., in an amount as described by any narrower range described above);

about 0.10% to about 2% by weight of hydrocolloid (e.g., in an amount as described by any narrower range described above);

wherein the total amount of the protein, food starch and hydrocolloid is within the range of about 0.25% to about 5% by weight of the whippable food product (e.g., in an amount as described by any narrower range described above)

As described above, the whippable food product as described herein contains less than 5% by weight fat. Advantageously, the present inventors have determined that the whippable food products described herein can aerated provide stable whipped food products even in the absence of high levels of fat. As used herein, the term "fat" includes fatty acid monoglycerides, diglycerides, and triglycerides as well as fatty acids themselves, in which the fatty acid component may be either saturated or unsaturated. In certain embodiments of the invention as described herein, the whippable food product contains less than 3% by weight fat. For example, in one embodiment of the invention as described herein, the amount of fat contained in the whippable food product is less than 1%, less than 0.5%, or even less than 0.1% by weight of the weight of the whippable food product. In other embodiments, the whippable food product is substantially free of fat.

In one embodiment of the invention disclosed herein, the whippable food product includes less than 1%, less than 0.1% or even less than 0.01% by weight of calcium carbonate. In one particular embodiment, the whippable food product is substantially free of calcium carbonate.

As described above, in certain embodiments of the invention as described herein, the whippable food product may include as an ingredient a fruit or vegetable solid. As the person of ordinary skill will appreciate, a variety, and combination, of fruit or vegetable solids may be used. For example, the fruit or vegetable solid may contain one or more solids of the following vegetables or fruits: acai, aloe, apple, apricot, banana, blackberry, blueberry, boysenberry, cantaloupe, cherry, coconut, coffee, tea, cranberry, date, elderberry, fig, gooseberry, grape, grapefruit, guava, honeydew, kiwi, kumquat, lemon, lime, mango, nectarine, orange, papaya, passion fruit, peach, pear, persimmon, pineapple, plantain, plum, pomegranate, prune, raspberry, star fruit, strawberry, tangerine, tomato, watermelon, avocado, cabbage, carrot, celery, cucumber, elderflower, kale, leek, potato, spinach, zucchini, citrus fiber, and konjac. Other types of fruit and vegetables may be available as well.

The person of ordinary skill in the art will recognize that a variety of techniques can be used to provide the fruit or vegetable solids to the whippable food product. For example, the vegetable or fruit solid may be obtained from either portions of fresh or dehydrated fruits or vegetables. The use of solids from fruit or vegetable can provide beneficial characteristics to the whippable food product, such as increased nutritional value, flavor and/or stability.

The amount of fruit or vegetable solids may vary based on the desired type of whippable food product. In certain embodiments of the invention as described herein, the amount of fruit or vegetable solids in the whippable food product may range from, but is not limited to, about 0.01% to about 20% of the weight of the whippable food product. For example, in one embodiment of the invention as described herein, the amount of fruit or vegetable solids ranges from about 0.1% to about 15% of the weight of the whippable food product. In other embodiments, the amount of fruit or vegetable solids in the whippable food product ranges from about 0.1% to about 10%, or from about 0.1% to about 5%, or from about 1% to about 10%, or from about 5% to about 15% of the weight of the whippable food product. As used herein, and as the person of ordinary skill in the art will appreciate, fruit or vegetable solids may be provided as part of the fruit or vegetable juice, as a separate ingredient, or as a combination thereof.

As described above, one ingredient in the whippable food product described herein may be a fruit or vegetable juice. As the person of ordinary skill will appreciate, a variety of fruit or vegetable juices may be used. For example, the juice may contain one or more of the following vegetable or fruit juices: acai, aloe, apple, apricot, banana, blackberry, blueberry, boysenberry, cantaloupe, cherry, coconut, coffee, tea, cranberry, date, elderberry, fig, gooseberry, grape, grapefruit, guava, honeydew, kiwi, kumquat, lemon, lime, mango, nectarine, orange, papaya, passion fruit, peach, pear, persimmon, pineapple, plantain, plum, potato, pomegranate, prune, raspberry, star fruit, strawberry, tangerine, tomato, watermelon, avocado, cabbage, carrot, celery, cucumber, elderflower, kale, leek, potato, spinach and zucchini. In one embodiment, the juice is coconut water. In other embodiments, coffee or tea is present. Other types of fruit and vegetables may be available as well.

The person of ordinary skill in the art will recognize that a variety of techniques can be used to provide the fruit or vegetable juice to the whippable food product. For example, diluted juice or juice concentrate can be used. The diluted juice may be diluted with water or other aqueous media. In contrast, the water contained in the juice mixtures can be removed to form juice concentrate. The amount of the juice or juice concentrate can vary, as the person of ordinary skill in the art will appreciate. Further, premade juices can be used, or freshly squeezed juice can be prepared as needed.

The amount of fruit or vegetable juice may vary based on the desired type of whippable food product. In certain embodiments of the invention as described herein, the amount of fruit or vegetable juice in the whippable food product may range from, but is not limited to, up to about 99% of the weight of the whippable food product. For example, in one embodiment of the invention as described herein, the amount of fruit or vegetable juice ranges from about 2% to about 25% of the weight of the whippable food product. In other embodiments, the amount of fruit or vegetable juice in the whippable food product ranges from about 2% to about 20%, or from about 2% to about 15%, or from about 5% to about 15%, or from about 10% to about 25%, or from about 2% to about 99%, or from about 30% to about 99%, or from about 50% to about 99% of the weight of the whippable food product. As used herein, and as the person of ordinary skill in the art will appreciate, the fruit or vegetable juice component of the whippable food product may provide a substantial portion of the water of the whippable food product.

As the person of ordinary skill in the art will appreciate, a wide variety of additional components may be present in the whippable food product, for example, to enhance flavor, viscosity, consistency, structure or processability. Examples of such additional components may include, but are not limited to, fruit or vegetable solids, sweetening agents, acids, or flavoring ingredients.

In certain embodiments of the invention as described herein, the whippable food product may include a sweetening agent, e.g., in the amount in the range of about 0.0001% to about 30% of the weight of the whippable food product. As the person of ordinary skill in the art will appreciate, a sweetening agent is a substance that may provide sweetness to the whippable food product while acting as a bulking agent that provides stabilizing properties. Sweetening agents may provide structure to the whippable food product by binding to liquid ingredients, such as water. In certain embodiments, the sweetening agent may be derived from materials including, but not limited to, plant-based materials, fruit based materials, vegetable-based materials, fermented materials, enzymatically processed materials, hydrolyzed materials, micronized materials, among others. As the person of ordinary skill will appreciate, a variety, and combination, of sweetening agents may be used, including, but not limited to, sucralose, monk fruit extract, luo han go, mogroside V, acesulfame potassium, corn syrup, high fructose corn syrup, glucose, fructose, corn syrup, galactose, D-psicose, sucrose, maltose, lactose, maltodextrin, dextrose, polydextrose, soluble corn fiber, sucralose, saccharin, aspartame, sucralose, neotame, advantame, stevia, stevioside, rebaudiosides A, B, C, D, M, X and combinations thereof.

erythritol, glycerol, maltitol, sorbitol, cane juice, molasses, agave nectar, barley malt syrup, brown rice syrup, honey, and raw sugar. Additionally, the sweetening agent may be include any a variety of high intensity sweetening agents, such as sucralose, saccharin, stevia extracts, stevioside, rebaudiosides A, B, C, D, M and X, aspartame, acesulfame potassium, monk fruit extract, luo han go, mogroside V, and neotame and combinations thereof, among others. Other sweetening agents may be available as well.

In one embodiment of the invention as described herein, the amount of sweetening agent from about 0.001% to about 25% of the weight of the whippable food product. In other embodiments, the amount of sweetening agent in the whippable food product ranges from about 0.001% to about 20%, from about 0.001% to about 20%, from about 0.01% to about 20%, or from about 0.1% to about 20%, or from about 5% to about 25%, or from about 10% to about 25%, or from about 0.001% to about 10%, or from about 0.001% to about 5%, or from about 0.01% to about 5%, or from about 0.01% to about 1% of the weight of the whippable food product.

The sweetening agent may be provided to the whippable food product in a variety of fashions. For example, the sweetening agent may be provided to the whippable food product as part of a fruit or vegetable ingredient (e.g., juice, solids, puree), and/or as a separate component.

In certain embodiments of the invention as described herein, the pH of the whippable food product is in the range of about 2 to about 7. For example, in one embodiment, the pH is in the range of about 2 to about 5, or in the range of about 3 to about 6, or in the range of about 4 to about 5. The pH level of the whippable food product will impact the structure, sturdiness, and longevity of a whipped food product made from the whippable food product, with a lower pH improving stability and stiffness of the whipped food product, depending on the proteins present in the whippable food product. pH will also affect the flavor of the product. The acid may be added to the whippable food product before or after aeration has occurred.

In certain embodiments of the invention as described herein, the whippable food product may contain an acid, e.g., in the amount in the range of about 0.0001% to about 5.0% of the weight of the whippable food product. In certain embodiments, the acid is not present as part of the fruit- or vegetable-based ingredient (e.g., juice, puree, solids). An added acid can be used to help reduce the pH level of the whippable food product (i.e., below that which would be provided by the other ingredients), which can lead to better stability and taste. A variety, and combination, of acids may be used, including, but not limited to, citric acid, tartaric acid, ascorbic acid, lactic acid, malic acid, fumaric acid, and phosphoric acid. As the person of ordinary skill in the art will appreciate, other acids may additionally or alternatively be used.

In certain embodiments of the invention as described herein, the whippable food product may contain an acid in the amount of, but not limited to, about 0.0001% to about 4% of the weight of the whippable food product. For example, in one embodiment of the invention as described herein, the amount of acid ranges from about 0.001% to about 5% of the weight of the whippable food product. In other embodiments, the amount of acid in the whippable food product ranges from about 0.001% to about 4%, from about 0.001% to about 3%, from about 0.01% to about 3%, from about 0.1% to about 4%, from about 0.001% to about 2%, from about 0.001% to about 1%, or from about 0.001% to about 0.5% of the weight of the whippable food product.

As used herein, and as the person of ordinary skill in the art will appreciate, an acid may be provided to the whippable food product in a variety of fashions. The acid may be provided as a solid (e.g., in crystalline or powdered form), or in concentrated form. In other embodiments, the acid is provided as an aqueous solution, e.g., of a solution that is in the range of up to about 90% by weight acid (e.g., up to about 50% acid, or 10-60% acid, or 20-60% acid).

In certain embodiments of the invention as described herein, the whippable food product may contain a flavoring agent, e.g., in the amount in the range of about 0.01% to about 40.0% of the weight of the whippable food product. The flavoring agent can be used to improve the taste and visual appeal of the whippable food product. The flavoring agent may be in many forms, including, but not limited to, liquids, powders, gels, solids, or pastes. Further, the flavoring agent may be a natural flavoring agent, a nature-identical flavoring agent, or an artificial flavoring agent. A variety, and combination, of flavoring agents may be used, including, but not limited to, the flavors provided by vegetable extracts, juices, and flavors from vegetables, fruits, coffee, yogurts, herbs (e.g., basil, mint), spices, meats, and plants, among others. Flavor agents such as diacetyl, isoamyl acetate, benzaldehyde, cinnamic aldehyde, ethyl propionate, methyl anthranilate, limonene, ethyl decadienoate, allyl hexanoate, ethyl maltol, ethylvanillin, methyl salicylate, glutamic acid, and acetic acid may also be used to enhance the taste of the whippable food product. Other flavoring agents may be available as well.

In certain embodiments of the invention as described herein, the whippable food product may contain a coloring agent, e.g., in the amount in the range of about 0.01% to about 40.0% of the weight of the whippable food product. The coloring agent may be any dye, pigment, or substance that imparts color when it is added to the whippable food product. The coloring agent may be in many forms, including liquids, powders, gels, solids, or pastes. Further, the coloring agent may be either natural or artificial. A variety, and combination, of flavoring agents may be used, including, but not limited to, beta-carotene, beta-apo-8' carotenol, riboflavin, caramel, carmine, FD&C Blue No. 1, FD&C Blue No. 2, FD&C Green No. 3, FD&C Red No. 3, FD&C Red No. 40, FD&C Yellow No. 5, FD&C Yellow No. 6, Citrus Red 2, Orange B, annatto, betanin, butterfly pea, chlorophyllin, elderberry juice, lycopene, cochineal, pandan, paprika, turmeric, saffron, grape color extract, fruit juice or solids, and vegetable juice or solids, such as beet juice and orange juice. Other types of flavoring agents may be available as well.

The whippable food products described herein are desirably provided in liquid form. In certain embodiments of the invention described here, the viscosity of the whippable food composition (i.e., in substantially unaerated form) ranges from about 500 cP to about 5000 cP. For example, in further embodiments, the viscosity ranges from about 1000 cP to about 4000 cP, from about 2000 cP to about 5000 cP, or from about 2000 cP to about 4000 cP.

Advantageously, the whippable food products described herein can be capable of being aerated, for example, to a stable foam having an overrun of 100%. As used herein, a stable foam is a foam that retains at least about 90% of its volume 5 minutes after aeration. In certain embodiments, the whippable food products described herein can be capable of being aerated, for example, to a stable foam having an overrun of 200%, of 250%, of 300%, of 400% or even of 500% (e.g., of at least 100%, at least 200%, at least 250%, at least 300%, at least 400% or even at least 500%).

The whippable food products described herein are desirably provided in substantially homogenous form. For example, in certain embodiments, the whippable food products described herein have substantially no isolated phases (e.g., liquid droplets or particles) greater than about 50 μm, greater than about 20 μm, or even greater than about 10 μm in dimension. In certain embodiments, the whippable food compositions can include discrete pieces of solid food matter, such as pieces of plant matter (e.g., fruit, vegetable, herbs, spices). Such discrete pieces of solid food matter can be, for example, larger than 100 μm in dimension, or even larger than 1 mm in dimension.

A number of methods are disclosed for producing the whippable food product as described herein. Generally, a method for making a whippable food product as described herein includes combining together the components of the whippable food product in any desirable order, using conventional techniques. As the person of ordinary skill in the art will appreciate, and as described above, the various components can be provided by a variety of ingredients. For example, fruit or vegetable juice, puree or solids can be used to provide some or all of the dietary fiber and/or water.

In certain embodiments, the vegetable or fruit fiber is first combined with water or fruit or vegetable juice to create a juice slurry. The remaining liquid ingredients, such as, but not limited to, water, juice, flavoring agents, or colouring agents may be mixed into the juice slurry. Protein, food starch, emulsifier and/or hydrocolloid may be added at any convenient stage of the process. A sweetener may be added or dissolved in the liquid mixture as well. The person of ordinary skill in the art can use standard mixing methods to combine the wet ingredients and dissolve the sweetening agent.

In yet further embodiments, various ingredients, such as any combination including two or more of hydrocolloid, emulsifier, starch, and protein, may be separately provided as a pre-blend. The pre-blend may be, for example, in dry form. The pre-blend may include a sweetening agent as well, and may also include any other desired ingredients. The pre-blend may contain, for example, a combination of the dry ingredients necessary to produce the whippable product. Other ingredients, such as the vegetable and fruit solids, the coloring agent, or the flavoring agent, among others, may be added to the pre-blend. The person of ordinary skill in the art can use standard mixing methods to combine the dry ingredients.

The liquid ingredients and the pre-blend may then be combined until fully dispersed. Based on the ingredients added to the mixture, mixing speed may be reduced in order to reduce air incorporation. At this time, the pH level of the whippable food product may be adjusted using an acidic solution, such as the acids disclosed herein, to adjust the pH level in the range of about 2 to about 7; alternatively, sufficient acid may be provided in the pre-blend.

In certain embodiments of the invention described herein, the whippable food product may be pasteurized. Pasteurization enables a mixture to remain fresher for a longer period of time and prolongs shelf life. Pasteurization occurs by heating a mixture to a desired temperature for a desired period of time and then cooling the mixture to a desired temperature prior to bottling. A person with ordinary skill in the art will appreciate that a variety of pasteurization processes may be used to pasteurize the mixture.

For example, the mixture may be pasteurized using ultra-high-temperature processing (UHT). UHT, otherwise known as ultra-heat treatment, or ultra-pasteurization, sterilizes food by heating it above 275° F., which is the temperature required to kill spores in milk. Using the UHT process, the mixture may be heated to a temperature within the range of about 265° F. to 350° F. The mixture may be heating for a time within the range of about 2 to about 5 seconds.

In another embodiment, the mixture may be pasteurized using high-temperature short time processing (HTST). HTST, otherwise known as flash pasteurization, is a method of heat pasteurization of perishable food product, such as those containing fruit and vegetable juices. HTST is performed to kill spoilage microorganisms, which improves safety of the products and extends their shelf-life. Using the HTST process, the mixture may be heated to a temperature within the range of about 160° F. to about 195° F. The mixture may be heated for a time within the range of about 10 seconds to about 7 minutes.

Using either UHT or HTST, in certain embodiments, the mixture may then be cooled to a temperature within the range of about 35° F. to about 55° F.

A person of ordinary skill in the art will appreciate that there are a variety of methods in which the mixture may be homogenized. In certain embodiments, the mixture may be homogenized using the application of a pressurized environment. In certain embodiments, homogenization using pressure may occur in a double stage process. First, a pressure within the range of about 800 psi to 1200 psi may be applied in a first stage. Then, a pressure within the range of about 400 psi to about 600 psi may be applied in the second stage. A person of ordinary skill in the art will appreciate that homogenization using pressure may be possible in one stage, where the pressure within the range of 200 psi to about 3000 psi may be applied.

In certain embodiments, the mixture may then be cooled to a temperature within the range of about 35° F. to about 55° F.

One particular example of a process for preparing a whippable food product as described herein includes:

(a) Adding water (e.g., as water per se or fruit or vegetable juice) to dietary fiber;

(b) Blending any other liquid ingredients with reconstituted dietary fiber;

(c) Dissolving desired sweeteners, flavoring agents, or coloring agents;

(d) Transferring dry ingredients in a bowl and mixing;

(e) Adding ingredients to bowl while mixing until fully combined to create a whippable food product;

(f) Adjusting the pH with acid to reach a pH of between 2 and 7;

(g) Pasteurizing the whippable food product by heating the product within the range of 160° F. to 350° F. for between 2 seconds and 7 minutes;

(h) Homogenizing the product at a pressure within the range of 200 psi to 3000 psi;

(i) Cooling the product to a temperature within the range of 35° F. to 55° F.

Another general process for making a whippable food product as described herein includes providing a mixture comprising one or more of protein, starch, emulsifier and hydrocolloid (e.g., in any combination as described above); and combining the stabilizing mixture with one or more liquid components to provide the whippable food product. The stabilizing mixture may, for example, include protein, starch, emulsifier and hydrocolloid; protein, starch and emulsifier; protein, starch and hydrocolloid; protein, emulsifier and hydrocolloid; starch, emulsifier and hydrocolloid; protein and starch, protein and emulsifier, protein and hydrocolloid, starch and emulsifier, starch and hydrocolloid, emulsifier and hydrocolloid; protein; starch; emulsifier; or hydrocolloid. In certain embodiments, dietary fiber is included in the mixture; in other embodiments, the mixture is substantially free of dietary fiber. In certain embodiments, the mixture includes a sweetener, e.g., a high intensity nonnutritive sweetener. In certain embodiments, the mixture includes one or more flavoring agents or one or more coloring agents. The liquid component can include, for example, one or more of water, juice, or other aqueous liquids. Other fruit or vegetable matter can be provided together with the liquid components, e.g., puree or solids. Sweetening agents, e.g., sugar, can also be provided together with the liquid components. As the person of ordinary skill will appreciate, the whippable food product can be homogenized to provide the desired homogeneity.

In certain embodiments of methods for making the whippable food products described herein, a pre-blend is added to a liquid, e.g., by a consumer or end user. Thus, a method can include providing a pre-blend including protein, food starch, hydrocolloid and, optionally dietary fiber (in combination or separately), for example in dry form, and mixing the pre-blend with one or more liquid components and with any other components (e.g., water, fiber, fruit/vegetable puree, solids or juice concentrate, coffee, tea, flavoring, sweetener). The consumer or end user can use any conventional equipment to mix the dry ingredients with the liquid, e.g., a blender or food processor.

Accordingly, another aspect of the disclosure is a pre-blend that includes protein, food starch, hydrocolloid and, optionally dietary fiber, e.g., as identified and in the relative amounts described above. For example, in one embodiment, a pre-blend includes protein (e.g., as identified above) in a relative amount of 13-500 parts; hydrocolloid (e.g., as identified above) in a relative amount of 5-500 parts; and food starch (e.g., as identified above) in a relative amount of 10-500 parts. For example, in various embodiments, the relative amounts of components can be (e.g., in any combination): protein, 13-500 parts, 13-350 parts, 13-200 parts, 13-100 parts, 25-500 parts, 25-350 parts, 25-200 parts, 25-100 parts, 50-500 parts, 50-350 parts, 50-200 parts, 50-100 parts, 100-500 parts, 100-350 parts, or 100-200 parts; starch, 10-500 parts, 10-400 parts, 10-300 parts, 10-200 parts, 10-100 parts, 25-500 parts, 25-400 parts, 25-300 parts, 25-200 parts, or 25-100 parts; hydrocolloid, 5-500 parts, 5-400 parts, 5-300 parts, 5-200 parts, 5-100 parts, 5-50 parts, 10-500 parts, 10-400 parts, 10-300 parts, 10-200 parts, 10-100 parts, 10-50 parts, 20-500 parts, 20-400 parts, 20-300 parts, 20-200 parts, 20-100 parts or 20-50 parts. The pre-blend can also include dietary fiber (e.g., as identified above), in an amount of 50-1000 parts, 50-800 parts, 50-600 parts, 50-500 parts, 50-300 parts, 50-200 parts, 75-1000 parts, 75-800 parts, 75-600 parts, 75-500 parts, 75-300 parts, 75-200 parts, 100-1000 parts, 100-800 parts, 100-600 parts, 100-500 parts, 200-1000 parts, 200-800 parts, 200-600 parts or 200-500 parts, in combination with any combination of parts above. The pre-blend can also include a bulking agent and/or a sweetener, in amounts desirable to provide a desired sweetness to the whippable food product and to provide a desired bulk to the pre-blend for simplicity of measurement. Other components can also be present in the pre-blend. The pre-blend desirably, however, includes at least 10% of food starch, at least 10% protein, and at least 10% hydrocolloid. In certain embodiments, the pre-blend includes at least 20% food starch, at least 20% protein and at least 20% hydrocolloid. In other embodiments, the pre-blend consists essentially of food starch, hydrocolloid, protein, optionally a bulking agent and/or a sweetener, optionally a flavouring, and optionally an acid.

Another aspect of the invention is a whipped food product. The whipped food product can have the same composition (on a weight percent basis, excluding air or other gas) as any of the whippable food products described in the embodiments above.

Another aspect of the disclosure is a method for making a whipped food product, including providing a whippable food product as described herein, and aerating the whippable food product to provide the whipped food product. The person of ordinary skill in the art will appreciate that "aerating," as used herein, need not use air, but rather includes any method of combining one or more gases with the whippable food product to form a foam. For example, the whippable food product can be whipped (manually or via machine, e.g., blender, hand mixer, stand mixer) to form the whipped food product. Alternatively, the whippable food product can be ejected from a pressurized canister through an orifice in order to form the whipped food product. Thus, another embodiment of the disclosure is a whippable food product as described herein, disposed in a pressurized canister including an orifice. The canister can be, for example, a reusable canister as commonly used in foodservice and home settings, such as that sold by ISI. The manufacturer's directions for whipped cream can be followed to provide whipped food products as described herein (e.g., using two cartridges per 500 mL canister). The person of ordinary skill in the art will appreciate that methods conventionally used to make whipped cream can be used to make the whipped food products described herein.

In certain embodiments, the whipped food products as described herein can remain in substantially whipped form for 10-15 minutes, with a nice peak to the product on top of cool beverages (including alcoholic beverages). After this, the peak with soften and still maintain to hold the air cell structure for, e.g., another 20-30 minutes, depending upon the environment it which it is held. In certain embodiments, the whipped food products as described herein will hold a peak for 10 minutes on warm to hot beverages (e.g., coffee, hot tea). As a fat source is not stabilizing the product, the whippable compositions described herein can be whipped at relatively high temperatures, as described above, for example, to provide a peak that remains for about five minutes and a foam structure for 20-30 minutes when whipped at 110° F.

Another aspect of the disclosure is a whipped food product made by a method comprising providing a whippable food product as described herein, and aerating the whippable food product to provide the whipped food product. Advantageously, the whipped food products can be formed as stable foams, and can be whipped at relatively high temperatures, e.g., of at least about 70° F., at least about 75° F., at least about 90° F. or even at least about 100° F.

The whipped food product as described herein can be in the form of a foam, i.e., with the liquid and solid materials of the composition forming the walls of the cellular structure of the foam, with one or more gasses entrapped inside the cells of the foam. As the person of ordinary skill of art will appreciate, a variety of gases can be present in the cells of the foam, e.g., air, nitrous oxide, carbon dioxide, or a combination thereof.

The whipped food product as described herein can be provided as a stable foam. In one embodiment, the whipped food product may be measured based on the amount of foam overrun. As one of ordinary skill in the art will appreciate, overrun is the amount of gas in the whipped food product, calculated as a percentage of the liquid/solid components; a foam that is by weight half air and half whippable composition has an overrun of 100. In one embodiment, the amount of overrun of the whipped food product compared to the whippable food product ranges from, but is not limited to, 100%-700%. For example, in one embodiment of the invention as described herein, the amount of overrun ranges from about 200% to about 700%. In other embodiments, the amount of overrun ranges from about 300% to about 600%, or about 100% to about 400%, or about 100% to about 500%, or about 100% to about 600%, or about 200% to about 600%, or about 200% to about 500%, or about 300% to about 700%, or about 250% to about 600%, or about 250% to about 500%, or about 250% to about 400%, or about 250% to about 350%. The foams can remain stable at relatively high temperatures, e.g., of at least about 70° F., at least about 75° F., at least about 90° F. or even at least about 100° F.

The invention will be further described with reference to the following Examples:

Example 1

A whippable food product was prepared from the following ingredients:

| Ingredient | Amount |
| --- | --- |
| Water | 71.78% |
| Sucrose, granulated | 15.00% |
| Coconut water concentrate (60 Brix) | 6.67% |
| Coconut puree, dried | 4.00% |
| Konjac flour | 0.05% |
| Citrus fiber, powder | 0.50% |
| Pre-Blend | 2.00% |
| (Modified corn starch) | (0.30%) |
| (Hydrolyzed casein) | (0.70%) |
| (Pectin) | (0.24%) |
| (Xanthan) | (0.10%) |
| (Dextrose) | (0.56%) |
| (Natural and artificial flavoring, coconut) | (0.10%) |
| Citric Acid Solution (50% Citric Acid, 50% Water) | 0.83% of Final Product |

To prepare the whippable food product, the coconut water concentrate, coconut puree, konjac, and citrus fiber were combined with the water into a slurry until the desired amount of fruit solids was reached. The granulated sugar was added to the juice slurry by mixing with a Liqwifier device until all of the sugar was properly dissolved. In a separate bowl, the pre-blend, which included modified food starch, hydrolyzed casein, pectin, xanthan, dextrose, and natural and artificial coconut flavoring was mixed together. Once the pre-blend was combined, it was added to the juice slurry and mixed until fully dispersed. The pH level was adjusted to a range to a pH of 3.75 using a 50% citric acid/50% water acidic solution. When the proper pH was reached, the whippable food product was pasteurized at 185 F for 30 seconds. In an alternative embodiment, the whippable food product was pasteurized at 285 F for 3 seconds.

The whippable food product was then homogenized at a total pressure of 1500 psi using a double stage process. In this process, the mixture was first exposed to a pressure of 1000 psi during a first stage. Then, the whippable food product was exposed to a pressure of 500 psi during a second stage. Once the whippable food product was cooled to 40 F, it was packaged in an aerosol canister.

Example 2

A whippable food product was similarly prepared from the following ingredients:

| Ingredient | Amount |
| --- | --- |
| Water | 77.45% |
| Sucrose, granulated | 15.00% |
| Dried coffee | 5.00% |
| Konjac flour | 0.05% |
| Citrus fiber, powder | 0.50% |
| Pre-Blend | 2.00% |
| (Modified corn starch) | (0.30%) |
| (Hydrolyzed casein) | (0.70%) |
| (Pectin) | (0.24%) |
| (Xanthan) | (0.10%) |
| (Dextrose) | (0.66%) |
| Citric Acid Solution (50% Citric Acid, 50% Water) | 0.83% of Final Product |

Example 3

A whippable food product was similarly prepared from the following ingredients:

| Ingredient | Amount |
| --- | --- |
| Water | 80.73% |
| Sucrose, granulated | 15.00% |
| Tea powder | 1.00% |
| Everfresh tea #18563 | 0.20% |
| True lemon | 0.70% |
| Konjac flour | 0.05% |
| Citrus fiber, powder | 0.50% |
| Pre-Blend | 2.00% |
| (Modified corn starch) | (0.30%) |
| (Hydrolyzed casein) | (0.70%) |
| (Pectin) | (0.24%) |
| (Xanthan) | (0.10%) |
| (Dextrose) | (0.66%) |
| Citric Acid Solution (50% Citric Acid, 50% Water) | 0.83% of Final Product |

The Examples 1-3 products were tested using a 500 mL ISI rechargeable canister. After mixing and heat treatment (as described generally above), samples were cooled to <40° F. and aged for a minimum of 2 hours (i.e., sufficient time for all colloid content to fully hydrate). Charging with gas can lower the temperature by approximately 2-3° F. making the product cool to <37° F. Samples are tested immediately after being charged with gas in the ISI canister.

Charging with 2 cartridges (at 500 mL product) provides an average overrun of 350-450% to the whipped food product. After approximately 10 minutes a 10-15% deflation is visible, leaving an overrun of 300-350%. The same testing was performed after the whippable food composition has been allowed to sit over 24 hours; no significant difference is observed.

Charging with 3 cartridges (at 500 mL product) provides 600-700% overrun. After 10 minutes, deflation is apparent, resulting in approximately 35-40% reduction of overrun to provide an overall overrun of 375-450%. Here too, the same testing was performed after the whippable food composition has been allowed to sit over 24 hours; no significant difference was observed.

The Example 1 formulation was tested for whippability at high temperature. The whippable food composition was charged with two cartridges in the ISI then allowed to sit in a warm water bath until the product internally reached 110° F. Initial overrun was common to be 250-300% and after about 5 minutes it would be reduced to 200-250% overrun. At this point the peaks were lost and it appeared to look like a dense froth more than a whipped product. Testing the product above 120° F. was unsafe to the operator and the product did not form a peak and was more of a dense frothy consistency. Thus, a warm foam can be dispensed, e.g., on a cold drink, to provide an opposite experience to drinking a hot drink with a cold whipped topping thereon.

Example 4

A whippable food product was similarly prepared from the following ingredients:

| Ingredient | Amount |
| --- | --- |
| Berry punch | 78.71% |
| Sucrose, granulated | 15.00% |
| White grape concentrate | 1.00% |
| Pre-Blend | 2.00% |
| (Modified corn starch) | (0.69%) |
| (Hydrolyzed wheat protein) | (0.55%) |
| (Pectin) | (0.26%) |
| (Guar gum) | (0.06%) |
| (Locust bean gum) | (0.03%) |
| (Xanthan gum) | (0.11%) |
| (Dextrose) | (0.29%) |

Example 5

A whippable food product was similarly prepared from the following ingredients:

| Ingredient | Amount |
| --- | --- |
| Orange juice | 83.00% |
| Sucrose, granulated | 15.00% |
| Pre-Blend | 2.00% |
| (Modified corn starch) | (0.69%) |
| (Hydrolyzed casein) | (0.60%) |
| (Pectin) | (0.30%) |
| (Guar gum) | (0.07%) |
| (Locust bean gum) | (0.03%) |
| (Xanthan gum) | (0.12%) |
| (Dextrose) | (0.19%) |

Example 6

A whippable food product was similarly prepared from the following ingredients:

| Ingredient | Amount |
| --- | --- |
| Water | 60.28% |
| Pineapple juice concentrate | 22.22% |
| Sucrose, granulated | 15.00% |
| Pre-Blend | 2.50% |
| (Modified corn starch) | (0.30%) |
| (Hydrolyzed casein) | (0.70%) |
| (Citrus fiber) | (0.40%) |
| (Pectin) | (0.24%) |
| (Konjac flour) | (0.10%) |
| (Xanthan gum) | (0.10%) |
| (Dextrose) | (0.66%) |

Example 7

A whippable food product was similarly prepared from the following ingredients:

| Ingredient | Amount |
| --- | --- |
| Water | 60.68% |
| Pineapple juice concentrate | 22.22% |
| Sucrose, granulated | 15.00% |
| Konjac flour | 0.10% |
| Pre-Blend | 2.00% |
| (Modified corn starch) | (0.60%) |
| (Hydrolyzed casein) | (0.50%) |
| (Pectin) | (0.24%) |
| (Guar gum) | (0.06%) |
| (Xanthan gum) | (0.10%) |
| (Dextrose) | (0.50%) |

Example 8

A whippable food product was similarly prepared from the following ingredients:

| Ingredient | Amount |
| --- | --- |
| Orange juice | 83.20% |
| Sucrose, granulated | 15.00% |
| Pre-Blend | 1.80% |
| (Modified corn starch) | (0.60%) |
| (Angel-type egg white) | (0.55%) |
| (Pectin) | (0.22%) |
| (Guar gum) | (0.03%) |
| (Locust bean gum) | (0.03%) |
| (Xanthan gum) | (0.08%) |
| (Dextrose) | (0.29%) |

When dispensed from an ISI canister, the whippable food products of Examples 4-8 formed stable foams with overruns in the range of 200%-300%. In view of the present specification, the person of ordinary skill in the art will modify these formulations to provide formulations capable of providing stable foams, for example, by increasing the amount of pre-blend or otherwise increasing the amounts of protein, starch, hydrocolloid and/or fiber in order to provide higher overruns and increased stability.

What is claimed is:

1. A whipped food composition in the form of a stable foam at a temperature of more than 70° F. having an overrun in the range of about 250% to about 700%, the whipped food composition consisting of a foam of a gas and a whipped base composition comprising:
    about 0.5% to about 5% by weight of dietary fiber;
    about 50% to about 95% by weight of water;
    about 0.25% to about 3.5% by weight of protein;
    about 0.25% to about 4% by weight of food starch; and
    about 0.10% to about 2% by weight of hydrocolloid; and
    wherein the total amount of protein, food starch, emulsifier and hydrocolloid are within the range of about 0.25% to about 10% by weight of the whipped base composition, and
    wherein the whipped base composition has less than 1% by weight fat.

2. The whipped food composition of claim 1, wherein less than 0.25% of emulsifier is present in the whipped base composition.

3. The whipped food composition of claim 1, wherein less than 0.5% fat is present in the whipped base composition.

4. The whipped food composition of claim 1, wherein the dietary fiber includes coconut fiber, citrus fiber, pineapple fiber, or a combination thereof.

5. The whipped food composition of claim 1, wherein more than 80% by weight of the dietary fiber component is an isolated, purified, and/or modified fiber.

6. The whipped food composition of claim 1, wherein the water is present in the range of about 65% to about 85% by weight of the whipped base composition.

7. The whipped food composition of claim 1, wherein at least 50% of the protein is hydrolyzed casein, hydrolyzed wheat protein, egg whites or whey protein, or a combination thereof.

8. The whipped food composition of claim 1, wherein the emulsifier is selected from the group consisting of xanthan gum, lactic acid esters of mono and diglycerides, acetic acid esters of mono and diglycerides, polyglycerol esters, propylene glycol esters, polypropylene glycol esters, sucrose esters, lecithin, cellulose gum, microcrystalline cellulose, hydroxypropyl methylcellulose, modified cellulose, propylene glycol alginatelecithin, monoglycerides, diglycerides, a polysorbate, calcium stearoyl-2-lactylate, lactylic stearate, sodium stearoyl fumarate, succinylated monoglyceride, or sodium stearoyl-2-lactylate, and mixtures thereof.

9. The whipped food composition of claim 1, wherein the hydrocolloid is pectin, guar gum, xanthan gum, or locust bean gum, or a combination thereof.

10. The whipped food composition of claim 1, wherein the hydrocolloid includes one or more of xanthan gum, pectin, carrageenan, guar gum, locust bean gum and cellulose gum and modified cellulose.

11. The whipped food composition of claim 1, wherein the total amount of the protein, food starch, emulsifier, and hydrocolloid are within the range of about 0.5% to about 5% by weight of the whipped base composition.

12. The whipped food composition of claim 1 wherein at least about 50% of the total protein, starch, emulsifier and hydrocolloid is provided by sources other than fruit or vegetable matter present in the whipped base composition.

13. The whipped food composition of claim 1, wherein the whipped base composition comprises about 0.1% to 15% by weight of a fruit or vegetable solid.

14. The whipped food composition of claim 13, wherein the whipped base composition comprises about 50% to 99% by weight of fruit or vegetable juice.

15. The whipped food composition of claim 1, having an overrun of at least 300%.

16. The whipped food composition according to claim 1, made by a process comprising providing a whippable base composition, and aerating the whippable base composition with the gas to form the whipped food product.

17. The whipped food composition according to claim 1, wherein the overrun of the whipped food composition is about 300% to about 600%.

18. A method of making a whipped food composition according to claim 1, the method comprising
    providing a whippable base composition comprising
        about 0.5% to about 5% by weight of dietary fiber;
        about 50% to about 95% by weight of water;
        about 0.25% to about 3.5% by weight of protein;
        about 0.25% to about 4% by weight of food starch; and
        about 0.10% to about 2% by weight of hydrocolloid; and
    wherein the total amount of protein, food starch, emulsifier and hydrocolloid are within the range of about 0.25% to about 10% by weight of the whippable food product, and wherein the whippable composition has less than 1% by weight fat; and aerating the whippable food product with the gas to provide a stable foam at a temperature of at least 70° F. having an overrun in the range of about 250% to about 700%.

19. The whipped food composition of claim 1, wherein the whippable composition comprises about 1% to about 15% by weight of a fruit or vegetable solid.

20. The whipped food composition of claim 1, wherein at least 50% of the dietary fiber is coconut fiber, citrus fiber, pineapple fiber, or a combination thereof.

21. The whipped food composition of claim 1, wherein the whipped base composition includes less than 0.05% of any fatty acyl-containing component.

22. A whipped food composition in the form of a stable foam at a temperature of more than 70° F. having an overrun in the range of about 250% to about 700%, the whipped food composition consisting of a foam of a gas and a whipped base composition comprising:

about 0.5% to about 10% by weight of dietary fiber;
about 50% to about 95% by weight of water;
about 0.13% to about 5% by weight of protein;
about 0.10% to about 5% by weight of food starch; and
about 0.02% to about 10% by weight of hydrocolloid; and
wherein the total amount of protein, food starch, emulsifier and hydrocolloid are within the range of about 0.25% to about 10% by weight of the whipped base composition, and wherein the whipped base composition has less than 1% by weight fat.

23. The whipped food composition of claim 22, wherein the whipped base composition includes less than 0.05% of any fatty acyl-containing component.

24. The whipped food composition of claim 22, wherein less than 0.5% fat is present in the whipped base composition.

* * * * *